May 15, 1928.  S. D. MOTT  1,670,043
MULTIPLE CONTROL SYSTEM
Filed March 20, 1924   3 Sheets-Sheet 1
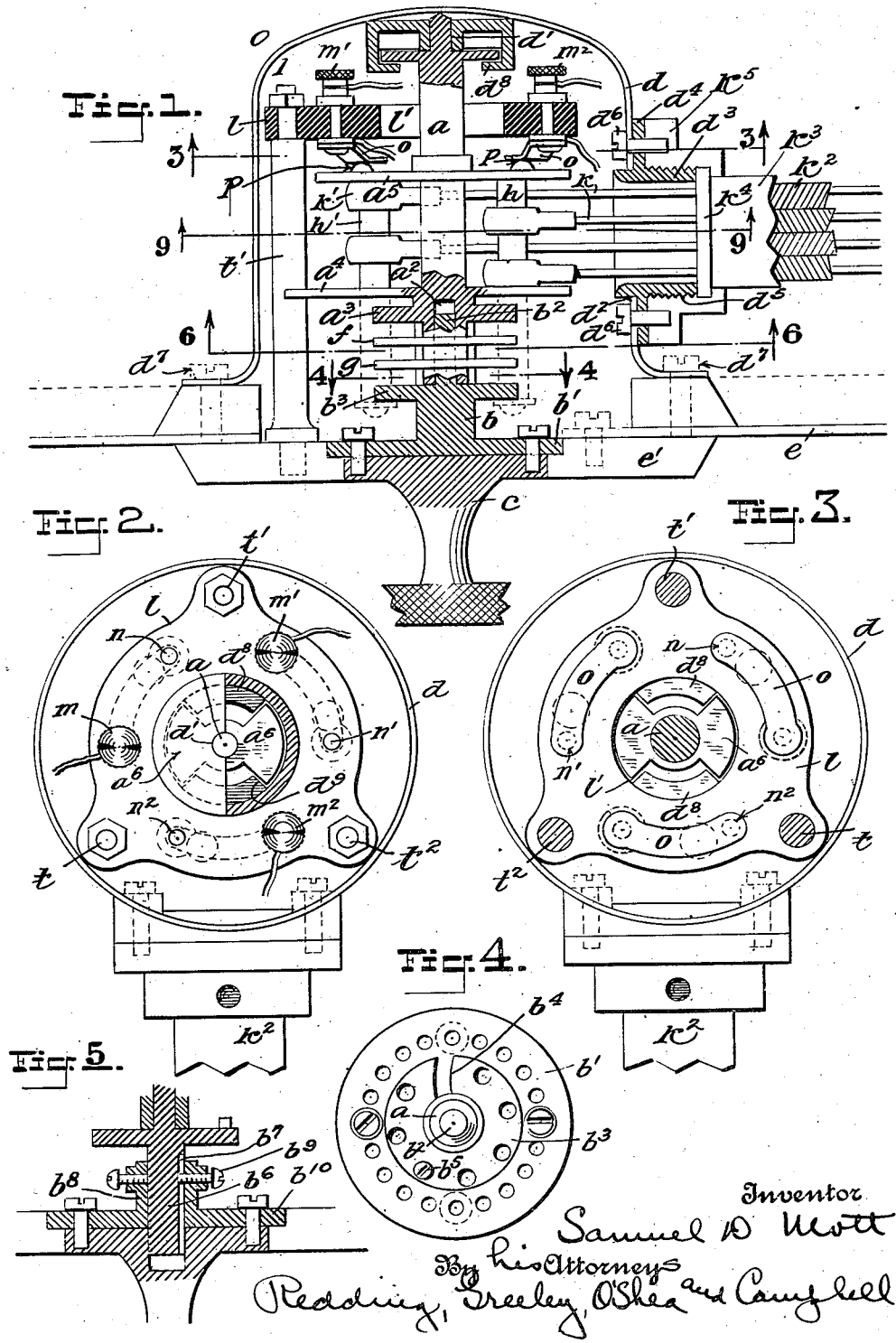

May 15, 1928. 1,670,043
S. D. MOTT
MULTIPLE CONTROL SYSTEM
Filed March 20, 1924 3 Sheets-Sheet 2
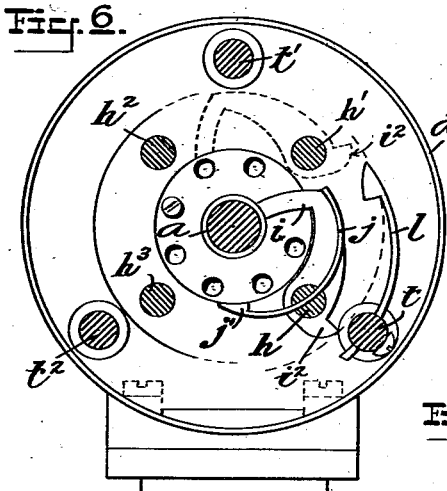
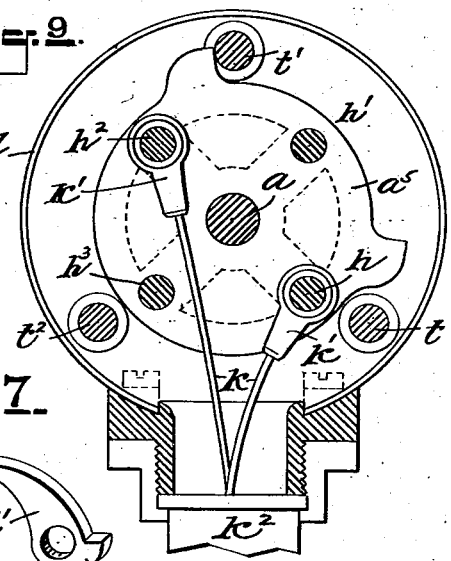
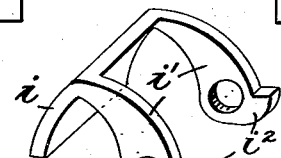
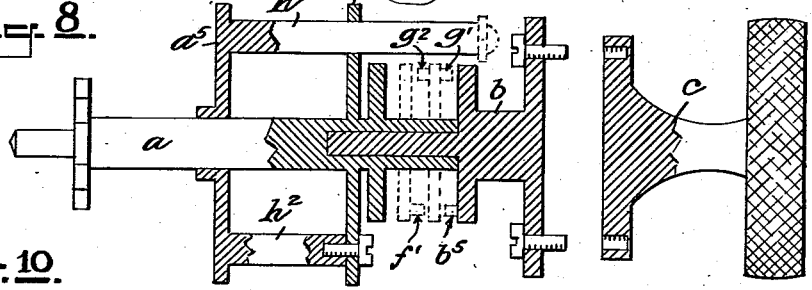
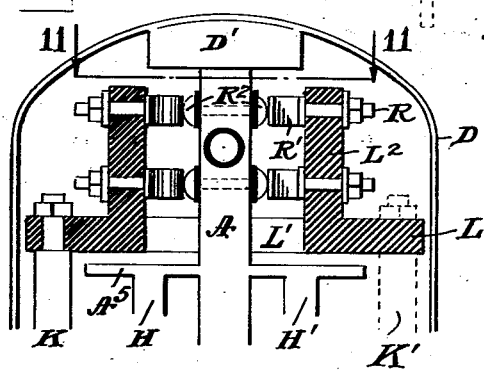
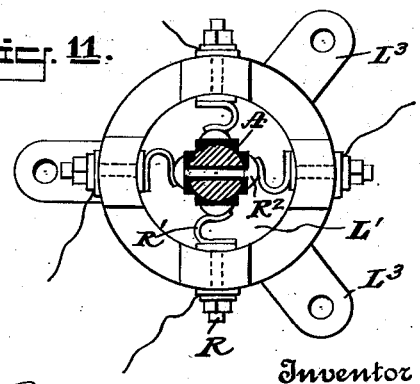
Inventor
Samuel D. Mott
By his Attorneys
Redding, Greeley, O'Shea and Campbell

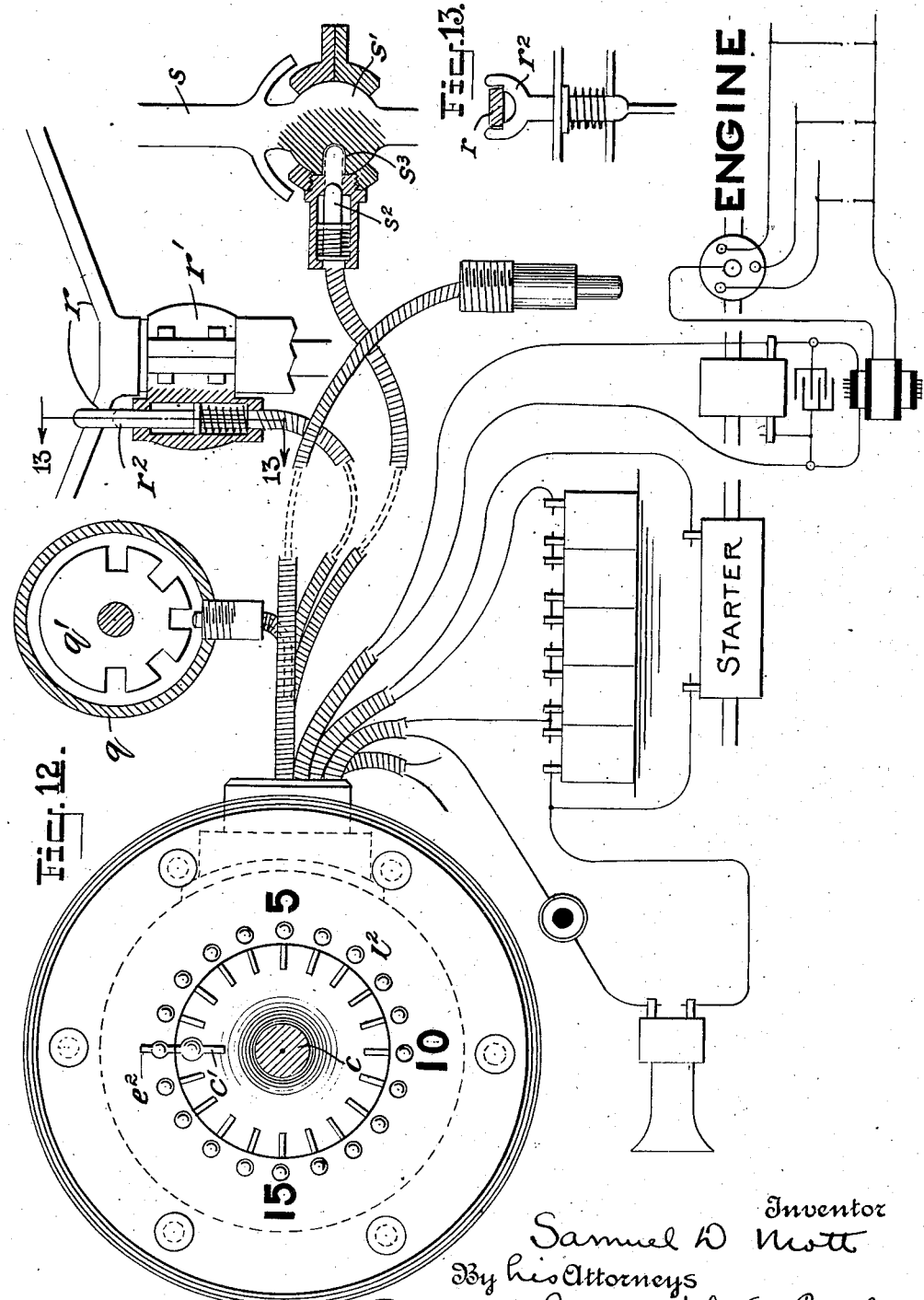

Patented May 15, 1928.

1,670,043

UNITED STATES PATENT OFFICE.

SAMUEL D. MOTT, OF PASSAIC, NEW JERSEY.

MULTIPLE-CONTROL SYSTEM.

Application filed March 20, 1924. Serial No. 700,741.

This invention relates broadly to a system for controlling a plurality of remote operative elements from a single central station or master control. The invention probably has its greatest applicability to motor vehicles wherein it is sought to render the vehicle totally inoperative or operative at the will of the owner or operator. To this end various vital operating parts of the vehicle, such as the steering mechanism, transmission, ignition system or the like may be provided with devices adapted to affect the several parts upon actuation of a single centrally located mechanism or master control carried, for instance, on the vehicle dash, and controlled by a lock. A further feature of the invention is the provision of a combination lock to control the master control. In accordance with the preferred embodiment of the invention a rotatable element is mounted on the dash and is connected mechanically or electrically with any one of the salient operating parts of the vehicle and may be so manipulated as to render such operating part or parts impotent. This master control element may be locked against surreptitious manipulation when the controlled parts are in operative or inoperative condition. The invention will now be described more fully in connection with the accompanying drawings illustrating preferred embodiments of the invention and in which:

Figure 1 is a view partly in section showing the means for controlling operating connections to the devices affecting the operativeness of the various essential parts of a motor vehicle.

Figure 2 is a view in end elevation and partly in section looking from the top in Figure 1 with the housing broken away.

Figure 3 is a view taken in the plane indicated by the line 3—3 in Figure 1 and looking in the direction of the arrows and showing electrical contacts for effecting the ignition circuits of an internal combustion engine, for instance.

Figure 4 is a view taken in the plane indicated by the line 4—4 in Figure 1 and looking in the direction of the arrows and showing means for changing the combination when a combination lock is used to control the operations of the device.

Figure 5 is a fragmentary view showing means for extending the length of the driving shaft.

Figure 6 is a view taken in the plane indicated by the line 6—6 in Figure 1 and showing the combination lock in operative and inoperative positions.

Figure 7 is a detail view showing one element of the combination lock.

Figure 8 is a detail view showing elements of the combination lock, certain parts being removed in the interest of clearness.

Figure 9 is a view taken in the plane indicated by the line 9—9 in Figure 1 and looking in the direction of the arrows and showing the use of mechanical connections for transmitting operating power to the devices controlling the respective essential parts of the machine.

Figure 10 is a view showing a modification of the invention in which provision is made for the use of electric connections between the master central control and the controlling devices at the various essential parts of the machine.

Figure 11 is a view taken in the plane indicated by the line 11—11 in Figure 10 and looking in the direction of the arrows.

Figure 12 is a somewhat diagrammatic view showing the controlling system according to the present invention when applied to a motor vehicle.

Figure 13 is a fragmentary view taken in the plane indicated by the line 13—13 in Figure 12 and looking in the direction of the arrows.

The master control is shown in the illustrated embodiment as carried upon one of a pair of aligned shafts, called for convenience, the driven shaft and indicated at $a$. The other of the aligned shafts, called for convenience sake, the driving shaft is indicated at $b$ in Figure 1 and is adapted to be operatively connected with the driven shaft by means of a lock of any convenient kind. As a lock, there has been illustrated a combination lock such as forms the subject matter of the co-pending application of the present applicant Serial No. 700,740 filed March 20, 1924. As in the co-pending application, the driving shaft $b$ is formed at one end thereof with flange $b'$ to which is secured a knurled head $c$ whereby the driving shaft may be rotated at the will of the operator. The aligned shafts are journaled in a housing $d$ shown as carried upon a dash board $e$ of a vehicle, the driving shaft $b$ being journaled in a cover plate $e'$ forming the front cover of the lock while the driven shaft $a$ is journaled in a bearing $d'$ supported in the end wall of the housing. The proximate end of shaft $a$ is formed with an annular recess $a^2$ to receive a cylindrical projection $b^2$ on the proximate end of the shaft $b$ to form a bearing between the aligned shafts. Rigidly carried with the respective shafts are a pair of flanges $a^3$, $b^3$, respectively, each formed with a slot such as is shown at $b^4$ in Figure 4. Between the tumblers $a^3$ and $b^3$ and suitably spaced therefrom are disposed a plurality of idler tumblers, two of which are shown in Figure 1 and lettered $f$ and $g$, respectively. These tumblers are also provided with slots similar in outline to the slot $b^4$. Also carried rigidly with the shaft $a$ is a flange $a^4$ and from this latter flange a shaft $h$ projects parallel with the aligned shafts and for a sufficient distance to overlie the tumblers. Rotatably mounted upon shaft $h$ is a locking element formed of the dog $i$ carried with lever arms $i'$ and adapted to be yieldingly held against the perimeters of the discs by means of the spring $j$ secured to the shaft $b$ and bearing at $j'$ upon the idler discs to serve as a brake thereon. The co-operating surfaces of the slots in the discs and dog lie in cylindrical planes concentric with the shaft $h$ whereby the dog may slide easily into and out of locking position. It will be apparent that when the slots in all the discs are aligned the dog will automatically enter the same to form a coupling between the driving and driven shafts. Carried upon one of the pillars $t$ having other purposes which will hereinafter appear is a resilient trip $l$ adapted to be yieldingly maintained in the path of movement of the lever arm $i^2$ when the dog is in coupling engagement with the tumblers to control the angle through which the aligned shafts may be rotated as a unit, it being evident that if the aligned shafts are turned so that the shaft $a$ assumes the position indicated at $h'$ in Figure 6 the trip will have engaged the lever arm $i^2$ and thrown the dog out of coupling engagement with the tumblers into the position shown in dotted lines in that figure. Tumbler $b^3$ and idler tumblers $f$ and $g$ are provided with interfering lugs $b^5$, $g'$, $g^2$ and $f'$, respectively, as illustrated in Figure 8. Tumblers of this nature have heretofore been provided in combination locks and it will be apparent that by suitably rotating the knurled head portions $c$ in clockwise and counterclockwise directions the tumblers may be set in predetermined positions whereby the slots in the four tumblers are aligned for the reception of the dog which, upon entering the slots, forms a coupling between the aligned shafts and permits them to be rotated as one by turning the knurled head. Means for changing the combination are provided as shown in the co-pending application, that is, the idler tumblers and the tumbler $b^3$ are each formed with an annular series of holes whereby the relative positions of the interfering lugs may be changed to alter individual numbers in the combination while the flange $b'$ is also formed with an annular series of holes as shown in Figure 4 whereby the relative position of the knob portion $c$ may be changed with respect to the driving shaft $b$ to change all the numbers of the combination to the same degree. As in the co-pending application the cover plate $e'$ is graduated as the scale $e^2$ (Figure 12) while the knob portion $c$ is formed with an index $c'$ as is usual in the art. The working out of a combination to permit the aligned shafts to be coupled is thought to be apparent from the foregoing description of the permutation mechanism and no further description of the same will be given as reference may be had if desired to the co-pending application.

Referring again to Figure 8 it will be observed that shaft $a$ has mounted thereon an annular disc $a^5$ carrying a plurality of shafts, four in the illustrated embodiment, $h$, $h'$, $h^2$ and $h^3$, respectively, shaft $h$ passing through the disc $a^4$ as previously described to provide an axis for the dog while shafts $h'$, $h^2$ and $h^3$ extend only as far as the disc $a^4$ and are secured thereto in any convenient manner. To the shafts may be secured Bowden wires $k$. Referring to Figure 1 it will be observed that the Bowden wires terminate in an annular bearing $k'$ carried with diametrically disposed shafts $h'$ and $h^3$ whereby revolution of the aligned shafts through an angle of 90 degrees will cause an axial movement of the Bowden wires, some in one direction and some in an opposite direction. These Bowden wires are each contained in a Bowden tube $k^2$ secured in a coupling element $k^3$ formed at its inner end with a flange $k^4$. The housing $d$ is formed with an opening $d^2$ in one wall opposite the shafts $h'$, $h^2$. A thimble $d^3$ is adapted to be inserted in the opening $d^2$ and is formed with a flange $d^4$ overlying the sides of the opening and secured thereto in any convenient manner. The outer portion of the thimble is threaded as at $d^5$ to receive the outer coupling member $k^5$. In order that the various members just described may not be disassociated one from another from the outside of the housing it is preferred that screws $d^6$ be threaded from the inside through the housing and flange $d^4$ and into the coupling member $k^5$. Means may also be incorporated within the housing whereby the rotation of the aligned shafts may be used to close various electrical circuits such as the ignition circuit, the starter etc. To this end an annular plate L of insulating material is mounted upon the three pillars $t, t', t^2$ and formed with a hole $l'$ through which the shaft $a$ extends. The plate is provided with a plurality of sets of terminals, three of which are shown in the illustrated embodiment at $m, n, m', n', m^2, n^2$ each set being interposed in the electrical circuits of the horn, starter and ignition to form a gap therebetween which may be closed by the spring contacts $o$ (Figure 3) secured to the lower end of the contacts $m$ and adapted to be pressed into contact with the terminals $n$ by means of spherical lugs $p$ carried with the disc $a^5$. It will be apparent that when the driven shaft is turned the lugs $p$ will be brought into contact with the spring contacts $o$ and cause them to move into engagement with the terminals $n$ to close the respective circuits and render the various electrical devices capable of operation.

Figures 10 and 11 illustrate a modification of the invention wherein the master control is designed for use in connection with electrically operated means instead of Bowden wires to control the functioning of an essential part of the vehicle. In the modified construction the driven shaft A has an end bearing D' in the housing D and carries an annular disc $A^5$ supporting the shafts H, H' etc. while the pillars K, K', etc. support the plate L of insulating material all in a manner substantially similar to that described hereinbefore. In this instance, however, the plate is formed with a lip $L^2$ surrounding the hole L' through which the shaft A extends. This lip is provided with a plurality of terminals R adapted to be respectively connected to one wire of each electrical circuit leading to means to control the functioning of any essential part of the vehicle and having a spring contact R' secured thereto. Co-operating contacts in the form of lugs $R^2$ are carried with a shaft A which serves as a portion of the return electrical conductor to the batteries, for instance, for all the circuits in the system. Any convenient means, may of course, be provided to actuate the devices controlling the several essential elements of the system, but probably the most effective device will involve the use of an electromagnet. It will be apparent that the lip $L^2$ need not be mounted upon an annular disc L, but as illustrated in Figure 11 projecting arms $L^3$ may be formed integral with the lip for connection to the respective pillars.

It will be understood that the effectiveness of the device is not limited to the precise number of Bowden wires shown nor to the precise number of contacts illustrated but that any number may be provided and to this end the shafts $a$ may be lengthened or the annular disc L increased in size.

In Figure 12 there is illustrated somewhat conventionally the application of the device to the prime mover and other essential parts of a motor vehicle. The usual housing for the switch $q'$ controlling the lights of the vehicle is shown at $q$. In the housing there is carried a spring pressed plunger which may be actuated by the Bowden wire to lock the lighting switch in any desired position whereby the lights on the car may be maintained as desired by the operator and cannot be tampered with. The spider of a steering wheel is indicated at $r$ and is freely rotatable with respect to a clamp $r'$ secured to the steering post and carrying a spring pressed fork $r^2$. Normally the spring retains the fork in engagement with an arm of the spider whereby the steering wheel and steering post are rigidly connected together but the forked arm $r^2$ may be withdrawn by the Bowden wire to render the vehicle incapable of being steered. The gear shift lever $s$ is shown as provided with the usual ball bearing $s'$. A spring pressed plunger $s^2$ is shown as normally retained under the action of the spring within a recess $s^3$ in the ball but the plunger may be withdrawn from the recess $s^3$ by means of a Bowden wire to permit the gears to be shifted.

To accommodate the present device to dash boards of varying thicknesses in different makes of cars etc. provision is made for lengthening the shaft $b$. In Figure 5 shaft $b$ is shown as provided with an extension $b^6$ formed with a slot $b^7$ and the plate $b^{10}$ is separate from the shaft $b$ and is provided with a sleeve portion $b^8$ adapted to surround the extension $b^6$, a screw $b^9$ being provided to enter the slot $b^7$ to prevent relative angular movement between the shaft and plate. Other screws may also be provided in the flange to take up play between the shaft and plate and form a rigid connection therebetween. The housing $d$ is shown as secured to the dash board by means of screws $d^7$. These screws may be removed from the outside of the housing. Locking means are, however, provided whereby the housing cannot be removed except by use of the combination. This locking means comprises a pair of diametrically disposed sector shaped flanges $a^6$ carried with the end of the shaft $a$ and adapted to lie within a chamber formed in the bearing $d'$ and be retained therein by flange $d^8$. Diametrically disposed clearances $d^9$ are formed in the flange $d^8$ whereby when shaft $a$ is turned to a predetermined position the wings $a^6$ may pass the flange upon axial movement of the housing. It will thus be apparent that the housing cannot be removed except by working out the combination and then turning the aligned shafts to a predetermined position in which the wings $a^6$ and clearances $d^9$ are in register.

The present invention is particularly applicable to motor vehicles to provide protective derangements of a nature which is not obvious and which may be ascertained and restored to operative condition only after skillful and time consuming attention. Various types of locks may be availed of to initiate the operation of the master control and the invention is not to be considered limited to motor vehicles but is applicable in any situation wherein a plurality of vital parts of a system are to be controlled from a central station. Various modifications may be made in the form and relation of the individual parts constituting the multiple control system and no limitation is intended except as indicated in the appended claims.

What I claim is:—

1. In combination with an element to be controlled, means to control said element including independent driving and driven members, manually operable means to connect said members for unitary motion, and means including a support for the connecting means to connect the driven member operatively with the element to be controlled.

2. In combination with an element to be controlled, means to control said element including independent driving and driven members, manually operable means to connect said members for unitary motion, a lock to control said manually operable means and means including a support for the connecting means to connect the driven member operatively with the element to be controlled.

3. In combination with an element to be controlled, means to control said element including independent driving and driven members, manually operable means to connect said members for unitary motion, a combination lock to control said manually operable means and means including a support for the connecting means to connect the driven member operatively with the element to be controlled.

4. In a multiple control system, in combination, a driving shaft, a driven shaft, a coupling between said shafts, means to control said coupling, means to control the functioning of a vital part of a system, means to initiate the operation of said last named control means including means for supporting the coupling means, and an operable connection between said last mentioned means and the driven shaft.

5. In a multiple control system, in combination, a driving shaft, a driven shaft, driving means carried with the driving shaft, driven means carried with the driven shaft, common means to automatically engage the means on both shafts when they are in predetermined positions, means to control the functioning of a vital part of a system, means to initiate the operation of said control means including means for supporting the engaging means, and an operative connection between said last mentioned means and the driven shaft.

6. In a multiple control system, in combination, a driving shaft, a driven shaft, driving means carried with the driving shaft, driven means carried with the driven shaft, idler means, common means to automatically engage the driving and driven means when said means and the idler means are in predetermined positions, means to control the functioning of a vital part of a system, means to initiate the operation of said control means, including means for supporting the common engaging means, and an operative connection between said last mentioned means and the driven shaft.

7. In a multiple control system, in combination, a driving shaft, a driven shaft, a disc formed with a slot carried with the driving shaft, a disc formed with a slot carried with the driven shaft, a plurality of idler discs each formed with a clearance and rotatably mounted on the shafts between said first mentioned discs, means to transmit motion from the disc on the driving shaft to the idler discs, including a coupling element pivoted eccentrically of the shafts and maintained yieldingly against the perimeters of the discs, means to automatically cause said coupling element to enter the slots when the discs are in predetermined positions, means to withdraw said member from said slots upon the rotation of the aligned shafts through an angle in excess of a predetermined angle, means to control the functioning of a vital part of a system, means to initiate the operation of said control means including a pivot for said coupling element, and an operative connection between said last mentioned means and the driven shaft.

8. In a multiple control system, in combination, a driving shaft, a driven shaft, driving means carried with the driving shaft, driven means carried with the driven shaft, idler means, common means adapted automatically to engage the driving and driven means when said means and the idler means are in predetermined positions, an electric circuit and means carried with the driven shaft and operable when the means are in engaging position to close said circuit.

9. In combination with a lock for controlling a remote element, a driving and driven means, means for coupling the two, a shaft for carrying the driven means, a frame mounted on the shaft, remote control means operated by the frame and means included in the frame structure for mounting the coupling means.

10. In combination with a lock, a shaft, lock means cooperating with the shaft, a housing enclosing the lock means and shaft and means for securing the housing including a lock, comprising means upon the shaft and cooperating engaging means upon the housing, the two means being disengaged upon proper manipulation of the shaft.

This specification signed this 19th day of February, A. D. 1924.

SAMUEL D. MOTT.